US009092699B2

(12) United States Patent
Falomkin et al.

(10) Patent No.: US 9,092,699 B2
(45) Date of Patent: Jul. 28, 2015

(54) METHOD FOR SEARCHING FOR OBJECTS IN VIDEO DATA RECEIVED FROM A FIXED CAMERA

(71) Applicant: Obschestvo s organichennoy otvetstvennostyu "ITV Group", Moscow (RU)

(72) Inventors: Igor Igorevich Falomkin, Moscow (RU); Egor Petrovich Suchkov, Krasnodarskiy kray (RU)

(73) Assignee: Obschestvo s ogranichennoy otvetstvennostyu "ITV Group", Moscow (RU)

( * ) Notice: Subject to any disclaimer, the term of this patent is extended or adjusted under 35 U.S.C. 154(b) by 480 days.

(21) Appl. No.: 13/632,310

(22) Filed: Oct. 1, 2012

(65) Prior Publication Data
US 2013/0088592 A1 Apr. 11, 2013

(30) Foreign Application Priority Data
Sep. 30, 2011 (RU) ................................ 2011139659

(51) Int. Cl.
H04N 7/18 (2006.01)
G06K 9/78 (2006.01)
G06F 17/30 (2006.01)
(52) U.S. Cl.
CPC ............ *G06K 9/78* (2013.01); *G06F 17/30843* (2013.01); *G06F 17/30846* (2013.01)
(58) Field of Classification Search
CPC .......... H04N 7/181; H04N 7/183; H04N 7/18
USPC ........................................................ 348/143
See application file for complete search history.

(56) References Cited

U.S. PATENT DOCUMENTS

| 5,455,561 | A | 10/1995 | Brown |
| 5,825,413 | A | 10/1998 | Mullis |
| 7,362,949 | B2 | 4/2008 | Jun et al. |
| 7,864,980 | B2 * | 1/2011 | Evans ........................... 382/103 |
| 2009/0219300 | A1 | 9/2009 | Peleg et al. |
| 2010/0092037 | A1 | 4/2010 | Peleg et al. |
| 2010/0125581 | A1 | 5/2010 | Peleg et al. |

OTHER PUBLICATIONS

The Oxford English Dictionary, article "Frame." http://oxforddictionaries.com/definition/english/frame?q=frame. 2012. (Spec, p. 1).
Y. Cai, R. Ng., "Indexing Spatio-Temporal Trajectories with Chebyshev Polynomials", Proceedings of the 2004 ACM SIGMOD International Conference on Management of Data SIGMOD 04, Jun. 2004, pp. 599-610. (Spec, p. 5).
P. Bakalov, M. Hadjieleftheriou, V.J. Tsotras, "Time Relaxed Spatiotemporal Trajectory Joins," Proceedings of the 13th Annual ACM International Workshop on Geographic Information Systems, 2005, pp. 182-191. (Spec, p. 5).

* cited by examiner

Primary Examiner — Chikaodili E Anyikire
(74) Attorney, Agent, or Firm — Collard & Roe, P.C.

(57) ABSTRACT

The invention relates to methods for searching for objects in video data represented by a sequence of frames showing images of a scene received from a fixed video camera and is based on the display of synthetic frames to the operator, each of said synthetic frame being capable of combining objects captured in different source frames. The method comprises constructing movement trajectories of each of the objects of interest to the operator; ordering said trajectories; compiling an updatable schedule for displaying the number of objects preset by the operator and automatically choosing for said schedule the display start times of each trajectory; constructing a plan for forming synthetic frames such that the condition of permissible mutual occlusion of the objects is fulfilled; and forming synthetic frames according to said plan and displaying them to the operator. The technical result consists in speeding the search and reducing memory size requirements and computational load.

7 Claims, 8 Drawing Sheets step "b"

step "c"

step "d"

METHOD FOR SEARCHING FOR OBJECTS IN VIDEO DATA RECEIVED FROM A FIXED CAMERA

CROSS REFERENCE TO RELATED APPLICATIONS

Applicant claims priority under 35 U.S.C. §119 of Russian Application having the Serial No. 2011139659, filed on Sep. 30, 2011, the disclosure of which is incorporated by reference.

FIELD OF THE INVENTION

The invention relates to video surveillance, in particular to methods for searching for objects in video data received from a fixed video camera.

Digital video surveillance systems accumulate an archive of video data that are a sequence of video frames hereinafter referred to as "frames" for convenience (see: The Oxford English Dictionary, http://oxforddictionaries.com, article "Frame"). These video data are also called "video". Each frame contains an image of a scene and its recording time. The archive is used for analyzing the events that occurred in the field of view of the fixed video camera. For an analysis to be made, a search is to be conducted for events of interest to the operator that are mapped in the sequence of frames stored in the archive. Herein an event is the presence of stationary or moving objects in the scene, their location, trajectory of their movement, and other characteristics of interest to the operator. An object may imply a human, animal, vehicle, or anything else.

The search for events of interest to the operator is complicated by the fact that viewing the accumulated archive may take several thousand hours for a single video camera. Reducing the search time is, therefore, one of the most important objectives of video surveillance system designs.

The invention can be used in various video surveillance systems, for example, in security systems, analytical systems for use in marketing research, and so on.

BACKGROUND OF THE INVENTION

An obvious search method is based on consecutive viewing of the accumulated entire video data archive at a constant speed, that is, viewing of the entire sequence of frames received from a fixed video camera. This method is disadvantageous because much time is needed to complete the search. On average, finding a needed event takes a time equal to half the time spent to view the accumulated archive.

Known is search method that comprises viewing the entire sequence of frames received from a fixed video camera and also viewing different fragments of the sequence at different speeds (see: U.S. Pat. No. 7,362,949, 2001, U.S. Class 386/68, "Intelligent Video System").

This method comprises the following actions for each fragment of a sequence of frames:
 calculating the factor of interest of the fragment to the operator;
 calculating, on the basis of this factor, the speed at which this fragment is shown to the operator on the display; and
 showing the fragment to the operator on the display at the speed calculated for this fragment.

For example, the following characteristics may be used as factors of interest at the operator's discretion:
 presence of any movement or change in the frame;
 presence of objects of interest to the operator in the frame; and
 presence of texts (in particular, news reports) in the frame.

Even though this method speeds up the search as compared to the obvious method for viewing the entire accumulated archive of video data, it still requires much time. A disadvantage of this method is also a inconvenience in visual perception of fragments of a sequence of frames shown at a variable speed. It will be noted that this method does not use a combination of objects images captured at different moments in time in one frame.

The method of U.S. Pat. No. 7,362,949 is used for searching video data in an archive that stores the entire sequence of frames received from a video camera at all moments in surveillance time. But known are methods for recording video data received from a video camera those only record fragments of a sequence of frames considered essential to the video data archive (see: U.S. Pat. No. 5,455,561, 1994, U.S. Class 340/541, "Automatic Security Monitor Reporter;" U.S. Pat. No. 5,825,413, 1995, U.S. Class 348/155, "Infrared Surveillance System with Controlled Video Recording;" and U.S. Pat. No. 7,864,980, 2003, U.S. Class 382/103, "Video Motion Anomaly Detector"). These recording methods help reduce the volume of the video data archive that allows one to reduce the time of searching for events of interest to the operator. In the method of U.S. Pat. No. 5,455,561, 1994, video data are recorded in the archive in "alarm" situations only, for example, the presence of intruders or fire. In the method of U.S. Pat. No. 5,825,413, video data are recorded in the archive only when the infrared sensor registers motion and indicates it. In the method of U.S. Pat. No. 7,864,980, video data are only recorded in the archive when the movement trajectories of generic points, or "point features," fall outside the pattern of normal behavior that is formed automatically on the basis of trajectories that were observed previously.

A disadvantage of the search using these recording methods is that they do not reduce sufficiently the time needed to view the accumulated video data archive and also lose information that could be received from a video camera but that cannot be used because recordings in the video data archive are not made of all the fragments of the sequence of frames.

For the purpose of reducing the video archive viewing time, synthetic frames, combining one or more objects pictured in different source frames, are created and used. Known are methods for forming a sequence of synthetic frames of images from a sequence of source images received from a video camera (see: U.S. patent application published under number US 2009/0219300 A1, 2006, U.S. Class 345/630, "Method and System for Producing a Video Synopsis," and U.S. patent application published under number US 2010/0125581 A1, 2009, U.S. Class 707/737, "Method and Systems for Producing a Video Synopsis Using Clustering").

The methods of these applications comprise:
 computing the static background;
 detecting moving objects;
 compiling a schedule for displaying each of the detected moving objects; and
 displaying several objects simultaneously to the operator against the computed static background, where the images of said objects were captured at different moments in time and, thereby, would have been shown at different moments in time had the source sequence of frames been viewed.

Application US 2009/0219300 A1 discloses two variants of implementation of the method for forming a sequence of synthetic frames. In the first variant, all computations are made at the synthetic frame construction stage, that is, off-line. In the second variant, moving objects and their movement trajectories are first detected on-line, and then the static background is computed off-line and other actions are performed.

In the method of Application US 2010/0125581 A1, for an object displaying schedule to be produced, the objects are combined according to the "similarity" of their external appearance and similarity of their movement trajectories (according to geometric proximity and speeds of movement).

A disadvantage of the method of Application US 2009/0219300 A1 is the large volume of computations needed for constructing the background, which takes much time, or the large memory capacity needed when the "running median" method is used for static background construction. Another disadvantage of the method of the above-referenced application is that the background is computed incorrectly when some parts of the background are occluded by the objects in more than 50% of the frames. Yet another disadvantage of this method is that a large volume of computations is required for compiling a full object displaying schedule (by contrast, the proposed method does not require a full object displaying schedule to be produced).

A disadvantage of the method of Application US 2010/0125581 A1 is the waste of time to join objects according to their similarity and similarity of their trajectories (by contrast, the proposed method does not require objects to be combined on this principle).

The prototype of the proposed method is the method for searching for objects in a sequence of images received from a fixed video camera disclosed in the U.S. patent application published under number US 2010/0092037 A1, 2007, U.S. Class 382/103, IPC[8] G06K 9/00, "Method and System for Video Indexing and Video Synopsis," by inventors S. Peleg et al.

Before we proceed to discuss the essence of the prototype of the proposed method, we will examine the concept used in the application on the prototype but called unsuccessfully that impedes comparison of the prototype with the proposed method. The prototype uses constructing, in respect of each object, a sequence of its images recorded at different points in time. In this application, each such sequence called "tube" or "activity" (p. 4, [0091]), that appears to—be a poor choice. In application US 2009/0219300 A1 (with S. Peleg among the inventors), this sequence is called "characteristic function" (p. 4, [0080]), a poor choice again because this is a broad concept. In Application US 2010/0125581 A1 (also with S. Peleg among the inventors), this sequence is also called "activity" (p. 2, [0037]), that is a poor choice, as we write above.

Each moment in time of frame registration in this sequence is put in correspondence with a subset of frame pixels presenting an image of the object in the frame and characterizing its position in the scene observed. From the mathematical viewpoint, this sequence is a graph mapping a set of moments in time of frame capturing in a set of all possible subsets of pixels in the frame. It would be more correct, therefore, to call this sequence "an object movement graph," instead of "tube," "activity" or "characteristic function". It is necessary, though, for convenience to order the elements of a set of frame registration moments in time in this graph in the ascending order of their values. This sequence could also be called "a spatiotemporal object movement map".

A more suitable and convenient term for this sequence appears to be an object movement trajectory, in which each of its points is put in correspondence with a pair consisting of a moment in frame capturing time and its corresponding subset of pixels in the frame. The moments in frame capturing time in this trajectory concept are assumed to be ordered in the ascending order.

This trajectory concept is similar to the concept of spatiotemporal trajectory in which location of an object is defined as a set of points making up a vector (see: article by Y. Cai, R. Ng., "Indexing Spatio-Temporal Trajectories with Chebyshev Polynomials", Proceedings of the 2004 ACM SIGMOD International Conference on Management of Data SIGMOD 04, pp. 599-610, http://citeseerx.ist.psu.edu/viewdoc/summary?doi=10.1.1.186.5274; definition of the term "trajectory" appears in the printed version of this article, p. 604, and in the Internet edition of this article, at p. 6).

This trajectory concept is identical to the concept of spatiotemporal trajectory in which the object movement trajectory is defined as a sequence of pairs <object position and point in time>, object position being, in turn, defined as a set of points making up a vector (see: article by P. Bakalov, M. Hadjieleftheriou, V. J. Tsotras, "Time Relaxed Spatiotemporal Trajectory Joins," Proceedings of the 13th Annual ACM International Workshop on Geographic Information Systems, 2005, pp. 182-191, http://www.2.research.att.com/~marioh/papers/acmgis05.pdf; definition of the "trajectory" concept is given at p. 184 of the printed edition of this article, and at p. 2 of the Internet edition of this article). It is stated at p. 182 of this article that this definition of the trajectory concept is used in various fields, including video surveillance systems.

In the following consideration of the prototype method, and the proposed method later on, we use the term "object movement trajectory" for designating a sequence of object positions.

The prototype method for searching for objects in a sequence of images received from a fixed video camera comprises:

detecting objects of interest to the operator in a source sequence of frames received from a fixed video camera; each frame representing an image of a scene and having a timestamp specifying the moment in time said frame was captured;

constructing a movement trajectory for each of the objects detected in which every point of said trajectory is put in correspondence with the position of the object in the frame and the moment in time when the frame was captured, the position of the object in the frame being represented by a set of frame pixels representing an image of the object;

forming a queue of movement trajectories of the objects detected;

compiling a schedule for displaying the detected objects in which the point in time for starting object display on the screen is given for the trajectory of each object;

constructing a plan for forming synthetic frames in accordance with the schedule such that several objects can be shown in the frames simultaneously in positions captured generally at different moments in time;

forming a successive synthetic frame in accordance with the plan by including in such synthetic frame the images of objects that must, in accordance with the plan, be shown in the synthetic frame simultaneously, and the background against which they are to be shown; and displaying on the screen the synthetic frames formed as above to the operator.

In the prototype method, the object displaying schedule is compiled to display at once all the objects the images of which are available in the video data archive simultaneously as is needed to produce an optimal schedule. Compiling an optimal schedule takes a lot of time.

Furthermore, the prototype method does not assure maintenance of the time-related order of location of objects in the sequence of synthetic frames, that is, an object whose image was recorded after the image of the object following it may be placed at first in the sequence.

To compute the image of the background for a scene observed, the prototype method uses all the frames of the source sequence of frames, or frames in the vicinity of a single current frame for which the background is computed. A large memory capacity and a large volume of computations are required for these purposes.

A disadvantage of the prototype method is, therefore, that it requires a significant length of time to perform a large number of computations and a large memory capacity, which increases significantly the time period between the operator's request for an object search to be performed and the time when he is shown the first synthetic frame.

A significant disadvantage of the prototype method is that the method does not assure display of all the objects detected, that is, some of the objects detected may not be shown because of the specifics of the optimization procedure used under Application US 2010/0092037 A1 (p. 6, [0111]).

Another disadvantage of the prototype method is that the time-related order in which the objects are shown may not be maintained, that is, an object appearing in the field of view of the video surveillance system later than the object appearing in the field of view of the system at an earlier time may be shown first. This causes inconvenience to the operator analyzing the situation in the scene observed. A further disadvantage of the pertinent art method is that the background is computed incorrectly in instances when some of the background points are occluded by objects in more than 50% of the frames.

SUMMARY OF THE INVENTION

The present invention aims to develop the method for searching for objects in a sequence of frames received from a fixed video camera to achieve, in comparison with the prototype, a technical result such as simultaneous attainment of the following goals:
  speeding up the search for objects;
  reducing the required memory capacity;
  lowering requirements for computing performance; and
  providing completeness of information and convenient of perception for object display on a screen.

Said providing completeness of information and said convenient for perception for object display on a screen combine the following purposes:
  assuring that all the objects detected are displayed;
  assuring that the order in which the objects are displayed is the same as the order in which they appeared in the field of view of the video camera;
  preventing any loss of information about the objects displayed;
  assuring that each object is not occluded by other objects during display, at least for a time that may be adjusted by the operator;
  maintaining the movement speed of objects on the screen when they are displayed in the sequence of synthetic frames close to the speed of their movement on the screen in the source sequence of frames; and
  showing each object in the minimum possible number of synthetic ëëframes sufficient for maintaining the required movement speed of the objects on the screen in the sequence of these frames.

This technical result is achieved due to the proposed method for searching for objects in video data received from a fixed video camera. This method comprises:
  detecting objects of interest to the operator in a source sequence of frames received from a fixed video camera, each frame representing an image of a scene and having a timestamp specifying the moment in time said frame was captured;
  constructing a trajectory of movement for each of the detected objects such that each point of the trajectory corresponds to the position of the object in a frame and the capture moment in time of said frame, the position of the object in the frame being represented by a set of frame pixels forming the image of said object;
  forming a queue of movement trajectories of the detected objects;
  compiling a schedule for displaying the detected objects to the operator, said schedule indicating, for the trajectory of each object, a start time upon which said object will be displayed on screen;
  constructing a plan for forming synthetic frames in accordance with said schedule, said synthetic frames may show images of several objects simultaneously in positions that, in the general case, they had in captured frames at different moments in time;
  forming successive synthetic frame in accordance with said plan by inserting the images of objects in said synthetic frame that, according to said plan, are to be shown in said synthetic frame simultaneously and the background against which they are to be shown;
  displaying the formed synthetic frames on screen to the operator; wherein said forming a queue of movement trajectories comprises:
    (a) ordering all the trajectories in said queue in ascending order of the moments in time when a respective object appeared in the video camera field of view;
    (b) assigning a serial number to each trajectory in the obtained ordered queue of said trajectories and to the object corresponding to said trajectory; and
  wherein said schedule for displaying the detected objects is compiled in the order of their serial numbers as follows:
    (a) including initially in said schedule the first object alone, and then
    (b) updating said schedule by removing therefrom objects with trajectories already fully displayed to the operator and adding thereto new objects, if the number of objects included
  in said schedule is not larger than the value preset by the operator; and wherein said constructing said plan for forming synthetic frames comprises constructing it when said schedule for displaying the detected objects is first compiled and then each time said schedule is updated; said plan consisting of elements, each one representing a set of trajectory points of different objects to be combined in one synthetic frame.

This allows the search for objects in a sequence of images to be speeded up, by significantly shortening the time interval between the moment when an object search request is issued and the moment when the first synthetic frame is displayed to the operator, and the memory size and computing performance requirements to be reduced. This result is achieved due to using the updatable current incomplete schedule for displaying the detected objects and constructing a plan for forming synthetic frames on its basis.

This technical result is also achieved due to said method in which updating of the schedule for displaying the detected objects comprises:
- adding to said schedule a successive object that has not so far been displayed;
- determining a suitable time to start displaying said added object such that the condition of permissible mutual occlusion of objects be fulfilled in all synthetic frames being formed on the basis of said schedule;
- compiling an updated schedule for displaying the detected objects; wherein said determining a suitable time and said compiling an updated schedule comprises:
  (a) checking sequentially step by step that said condition of permissible mutual occlusion of objects holds for tentative values of start time of displaying said added object, these tentative time values are being tested in an ascending order at specified discreteness within the range from display start time of an object having a preceding serial number to the display completion time of all objects included in the schedule, except for the added object;
  (b) compiling, at each checking step, a tentative schedule for displaying the detected objects, including said added object, wherein compiling the tentative schedule comprises setting in said tentative schedule the successive tentative time value as the start time to display said added object;
  (c) constructing a plan for forming synthetic frames according to said tentative schedule for all objects included in said schedule;
  (d) checking thereafter if the condition of permissible mutual occlusion of objects holds in all synthetic frames and, depending on the outcome, proceeding to the steps of:
  (e) proceeding-to checking the next tentative time value, if said condition does not hold; or otherwise,
  (f) accepting the current tentative time value as the time to start displaying the added object and accepting the compiled tentative schedule as said updated schedule for displaying the detected objects, if said condition is held.

This facilitates speeding up the search for objects, reducing the required memory capacity and lowering requirements to computing performance due to proposed compiling a current incomplete updatable schedule for displaying the detected objects because of compiling said schedule assures that all object detected are displayed and maintains the objects displaying order that is identical to the order in which the objects appeared in the field of view of the video camera.

This technical result is also achieved due to proposed constructing the plan for forming synthetic frames for all objects included in the schedule for displaying the detected objects, proposed constructing said plan comprises:
- translating the source trajectory of each object along the time axis such that the translated trajectory would begins at the display start time indicated in the schedule and storing the translation value, being equal to the difference between the moment in time corresponding to said object's source trajectory first point and the display start time of said object;
- adding a fictitious point to the translated trajectory of each object, wherein said fictitious point corresponds to a fictitious moment in time identical for all objects that is smaller than the display start time for any object in said schedule;
- setting the collection of fictitious points of all translated trajectories, corresponding to said fictitious moment in time, as the initial fictitious element of said plan being constructed;
- constructing consecutively elements of said plan, wherein each of said elements has a set of points of translated trajectories of different objects to be shown in one synthetic frame, said set containing not more than one point of each translated trajectory, wherein constructing each next element of said plan comprises the sequence of the following operations:
  (a) adding a fictitious point of the trajectory of the added object to the last formed element of said plan, if the need for updating the schedule for displaying the detected objects arose before the completion of constructing said plan;
  (b) selecting, in each translated trajectory, a point that, on the time axis, is next-but-one to the right of said trajectory's point included in the preceding element of the plan;
  (c) finding a point having the minimum moment in time among said selected points of all trajectories; and
  (d) selecting a point for each translated trajectory that is nearest in time to the left of said minimum moment in time and setting the set of said selected points as the next element of the plan.

This facilitates speeding up the search for objects, reducing the required memory capacity and lowering requirement to computing performance due to constructing of a plan for forming synthetic frames, assures that all the objects detected are displayed, and allows all the positions in the synthetic frames preventing the loss of information about the objects, and also allows of in each object to be displayed in minimum number of synthetic frames sufficient for maintaining the required movement speed of objects on the screen in the sequence of these frames.

This technical result is achieved due to the fact that checking the condition of permissible mutual occlusion of the objects comprises:
  (a) checking each element of said plan for forming synthetic frames, provided said element contains the successive added object, for the presence of pixels in the image of said object having identical within-frame coordinates with pixels of other objects contained in said element of the plan;
  (b) putting on record the fact of impermissible intersection of the added object with other objects in said element of the plan, if the number of said pixels common for the added object and at least one of other objects exceeds the threshold preset by the operator;
  (c) counting the number (A) of the elements of said plan for each object contained in said tentative schedule, except for the added object, for which said object intersects impermissibly with the added object;
  (d) counting the number (B) of the elements of said plan for each object in which said object occurs;
  (e) checking the conditions:

$$A_i/B_1 < \alpha_i, \quad (11)$$

$$A_i/B_c < \alpha_c, \quad (12)$$

where:
  i is the object serial number, except for the object added to the current schedule to be updated;
  c is the serial number of the object added to said current schedule;
  $A_i$ is the number of elements of said plan for which the i-th object intersects impermissibly with the added object;
  $B_i$ is the number of elements of said plan in which the i-th object occurs;

$B_c$ is the number of elements of said plan in which the added object occurs; and $\alpha_i$ and $\alpha_c$ are constants that may be chosen depending on the importance of the object to the operator; in a particular case, $\alpha_i=\alpha_c=$const for all i; and (f) generating a message that the condition of permissible mutual occlusion of objects is fulfilled, if conditions (11) and (12) are satisfied simultaneously.

This assures that each object is displayed without being occluded by other objects for at least a time that may be adjusted by operator using the $\alpha_i$ and $\alpha_c$ constants.

Attainment of this technical result is facilitated that forming the successive synthetic frame corresponding to any element of the plan for forming synthetic frames comprises:

(a) finding, in the source sequence, frames that correspond to points of the translated trajectories of objects, these points are contained in the element of said plan, said element corresponding to the synthetic frame being formed, finding said frames is performed by the capture times of said frames, said time being calculated as a sum of the translation value corresponding to the translated trajectory of said object and the moment in time corresponding of said point of said trajectory;

(b) choosing from said frames a frame that corresponds to the object with the least serial number and accepting said frame as a reference frame on the basis of which a synthetic frame is to be constructed;

(c) forming an intermediate frame on the basis of the reference frame, wherein the intermediate frame contains objects of the reference frame to be displayed and the background against which they are to be displayed; and (d) composing said successive synthetic frame by inserting, in the obtained intermediate frame, the images of other objects the trajectory points of which were included in the plan element corresponding to the synthetic frame being formed.

This facilitates speeding up the search for objects, reducing the required memory capacity and lowering requirements to computing performance due to a successive synthetic frame being formed as proposed.

Attainment of this technical result is also facilitated by the fact that forming the synthetic frame background comprises replacing reference frame fragments occupied by any objects except those that are to be shown in the synthetic frame being formed with object-free fragments from other frames of the source sequence, said other frames corresponding to the trajectory points of objects shown in said plan element corresponding to the synthetic frame being formed.

This also facilitates speeding up the search for objects, reducing the required memory capacity and lowering requirements to computing performance due to a successive synthetic frame being formed as proposed.

This technical result is also attained in the proposed method that further comprises displaying to the operator on the screen each successive formed synthetic frame with a delay equal to the minimum nonzero difference between the capture moments in time of any object represented into the preceding and successive synthetic frames.

This, assures that objects move on the screen as they are shown in the sequence of synthetic frames at the speed close to the speed of their movement on the screen in the source sequence of frame.

DETAILED DESCRIPTION

Basic Stages of the Claimed Method

The proposed method operates on a sequence of frames, referred to hereinafter as the source sequence of frames, received from a fixed video camera and stored in the memory of a video surveillance system. The source sequence of images is represented in the source sequence of frames. Each frame contains the image of a scene and a timestamp specifying the moment in time when said frame was captured. An image of a scene may contain images of one object or more objects that may be of interest to the operator and always a background against which said objects are presented. In simpler terms, one can say that the image of a scene shown in a frame contains one or more objects and a background to mean that the scene image contains images of said objects.

Figure 1:
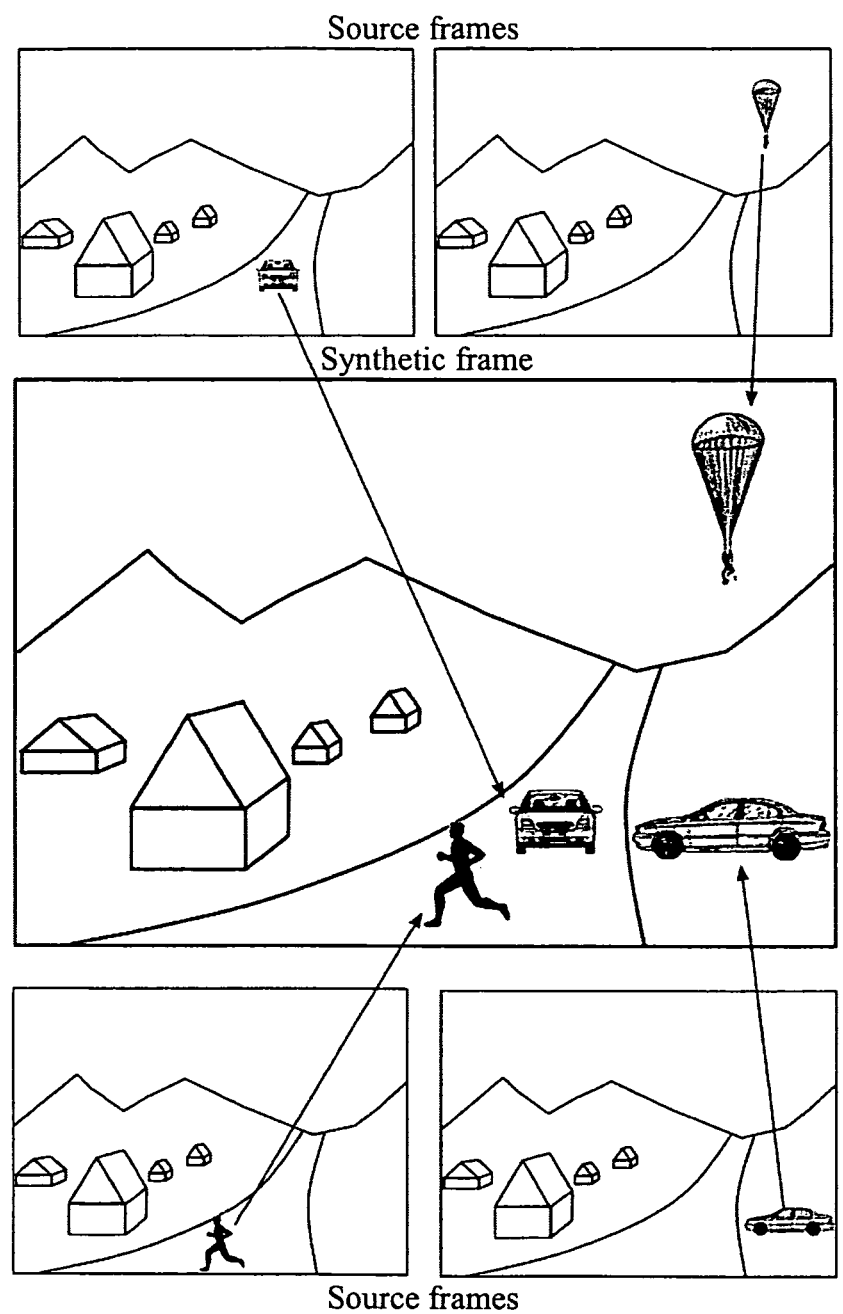
FIG. 1 shows an example of combining four objects captured in different source frames in one synthetic frame.

The proposed method is based on forming synthetic frames from source frames and displaying them to the operator. A single synthetic frame combines images of objects captured at different moments in time, that is, contained in different source frames. When the images of these objects are placed in a single synthetic frame they are not to occlude one another or are to occlude one another to a permissible extent. The example of FIG. 1 shows a synthetic frame combining images of objects (a running man, two cars, and a parachutist) obtained from different source frames.

Figure 2:
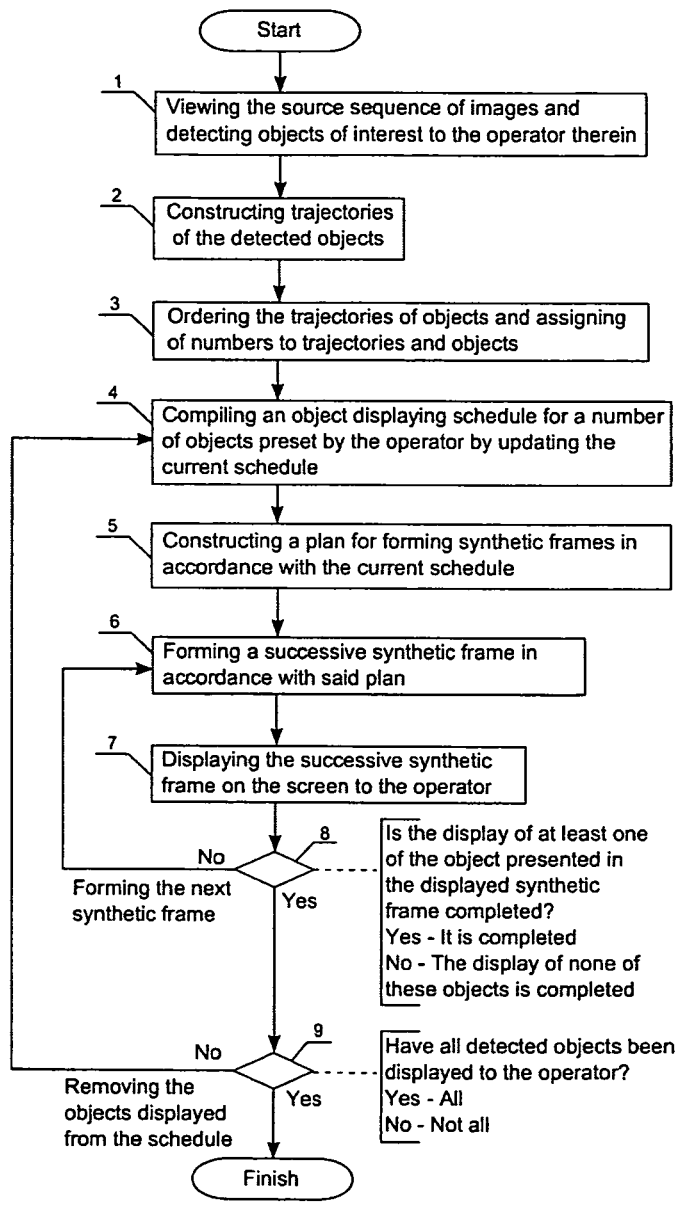
FIG. 2 is a flow chart of the basic stages of the proposed method for searching for objects in a sequence of frames received from a fixed video camera.

The basic stages of the proposed method are shown in FIG. 2 as action blocks 1 to 9. The proposed method for searching for objects in a sequence of frames received from a fixed video camera consists in as follows.

A computer system (not shown in the drawings) that implements the proposed method views the source sequence of frames and detects objects of interest to the operator therein (block 1).

Said system constructs a movement trajectory of each of the objects detected (block 2). Each point of the trajectory is put in correspondence with the position of the object in the frame and the time of frame registration. The position of the object in the frame is represented by a set of pixels ("points") of the frame representing the image of the object.

The trajectory of the detected object is described by the tuple:

$$T_j = <(M_{jc}, t_\alpha), \ldots, (M_{ji}, t_i), \ldots, (M_{j\beta}, t_{62})>, \quad (1)$$

where:

$T_j$ is trajectory of the j-th object detected;

j is number of the object in the order of its detection;

i is number of the source frame;

α and β are minimum and maximum numbers of the source frames representing the j-th object;

$\alpha \leq i \leq \beta$;

$M_{ji}$ is a set of pixels ("points") of the source frame representing the image of the j-th object in said frame; $M_{ji}$ may be a set of points of a geometrical figure, for example, a rectangle, circumscribing about (or, in other words, overlaying) the image of the j-th object in the frame; and $t_i$ is moment in time when the i-th source frame is captured.

The trajectory of the detected object is, therefore, a sequence of its positions in the frames. Each such position is put in correspondence with the moment in time when the frame was obtained.

Next, said system forms a queue of said trajectories. Said system orders all trajectories of object movement in this queue in the ascending order of the moment in time when objects corresponding to said trajectories appeared in the field of view of the video camera (block 3). In other words, said system, for example, arranges said trajectories in the memory in an order in which the trajectories of one object or several objects that appeared simultaneously in the field of view of the video camera earlier than all other objects are placed first. Following them, said system places the trajectories of objects that appeared simultaneously in the field of view of the video camera after said first objects, but before all other objects, and so on.

The serial number γ of a trajectory in the ordered set of these trajectories is assigned by said system to said trajectory and the object corresponding to it (block 3). Number y may be different from number j of the detected object.

Hereupon said system compiles a schedule for displaying the detected objects for the number of objects preset by the operator (block 4). Said system records the start time for an object to be displayed on the screen for the trajectory of each object included (or, in the other words, listed or specified) in the schedule. The schedule for displaying the detected objects is described by the tuple:

$$S=<(\gamma^{(1)},t_{start,\gamma(1)}), \ldots ,(\gamma^{(\lambda)},t_{start,\gamma(\lambda)}), \ldots ,(\gamma^{(h)},t_{start,\gamma(h)})>, \quad (2)$$

where:

S is schedule for displaying for-the detected objects;

γ is serial number of a trajectory in the ordered set of trajectories of objects;

λ is serial number of a trajectory in the current schedule, $1 \leq \lambda \leq h$;

h is number of objects preset by the operator in the schedule; and $t_{start,\gamma(\lambda)}$ is start time for displaying the y-th trajectory assigned number λ in the current schedule.

Initially, said system includes only the first object from the ordered set of objects in the schedule for displaying ordered objects, that is, an object having the smallest serial number. Said system then updates the schedule by removing objects having trajectories shown in full therefrom and adding new objects to the schedule. The number of objects in the schedule does not exceed the value h preset by the operator.

In accordance with each current schedule (2), said system constructs a plan for forming synthetic frames (block 5). Each synthetic frame may show several objects simultaneously in positions which, in the general case, had in captured frames at different moments in time. Said system uses said schedule (2), upon initial creation and each update thereof, to construct said plan for forming synthetic frames. The plan consists of elements, each containing a set of trajectory points of different objects to be shown in a single synthetic frame. The points in said set may be represented differently depending on the selected embodiment of the proposed method. For example, a point in this set may be represented by a pair consisting of trajectory number γ of the γ-th object in the ordered set of object trajectories and the moment in time corresponding to said point. Said pair is a code of said point.

The current plan for forming synthetic frames is described by the tuple:

$$P=<E_1, \ldots ,E_q, \ldots ,E_d>, \quad (3)$$

where:

P is plan for forming synthetic frames;

$E_q$ is element of the plan corresponding to the q-th synthetic frame to be formed in accordance with the current schedule for displaying the detected objects; and q is number of a plan element coinciding with the number of a synthetic frame to be formed in accordance with the current schedule for displaying the detected objects, $1 \leq q \leq d$.

In accordance with plan (3), said system forms a successive synthetic frame (block 6).

In block 6, said system constructs a background of a successive synthetic frame being formed and overlays thereon the images of objects that are, in accordance with said plan (3), to be shown in said synthetic frame simultaneously.

According to said plan for forming synthetic frames, said system displays a successive formed synthetic frame on the screen to the operator (block 7).

Following this, said system checks whether the display of objects the trajectory points of which were present in the synthetic frame has been completed (block 8). If the display of none of these objects has been completed, said system gives over control to block 6 in which said system forms a new (successive) synthetic frame in accordance with plan (3) and then displays it in block 7. If display of at least one of these objects is completed, said system checks in block 9 whether all the detected objects have been shown to the operator. Unless all the detected objects have been displayed, said system removes the objects displayed from the current object displaying schedule in block 4 and adds thereto a successive object still not displayed according to its number γ. If all the detected objects have been displayed to the operator on the screen, the formation of synthetic frames and the display thereof to the operator are completed.

Choice of Start Time for the Display of Objects

Said system chooses the moments in time to start object display as it updates the schedule for displaying the detected objects. The schedule for the display of objects is updated by changing the set of objects in the schedule. The change may be effected by adding a successive object that has not yet been shown and by removing an object shown. When a successive object still not shown (block 4) is added, said system choose a suitable time to start displaying said added object such that the condition of permissible mutual occlusion of objects be fulfilled in all synthetic frames to be formed on the basis of the updated schedule;

Said system makes this choice from time values within the range from the display start time of an object having a preceding serial number to the display completion time of all objects in the updated schedule. To do this sequentially step by step, said system checks the occlusion condition for all time values within said range as follows.

Said system calculates these time values in the ascending order with a specified discreteness and tests the successive value at each checking step as the tentative value of start time of displaying said added object. For this purpose, the system compiles a tentative schedule for displaying of the detected objects in which the successive object is added at each checking step of a successive tentative time value being tested and indicates the next successive tentative time value to be tested as the display start time of the object in the tentative schedule.

Said system then uses the tentative schedule to construct a plan for forming synthetic frames for all objects in the schedule (block 5). Next, said system checks the condition of permissible mutual occlusion of the objects in all the synthetic frames corresponding to said plan. If this condition is not fulfilled, said system proceeds to check the next tentative time value being tested. If this condition is fulfilled, said system sets the value checked as the display start time of the added object and the tentative object displaying schedule as an updated object displaying schedule.

Said system, therefore, constructs a plan for forming synthetic frames for each tentative object displaying schedule, one of which is set as an updated object displaying schedule. Now, the proposed method for constructing a plan for forming synthetic frames will be considered first, to be followed by a method to check the condition of permissible mutual occlusion on the basis said plan.

Constructing a Plan for Forming Synthetic Frames

Figure 3:
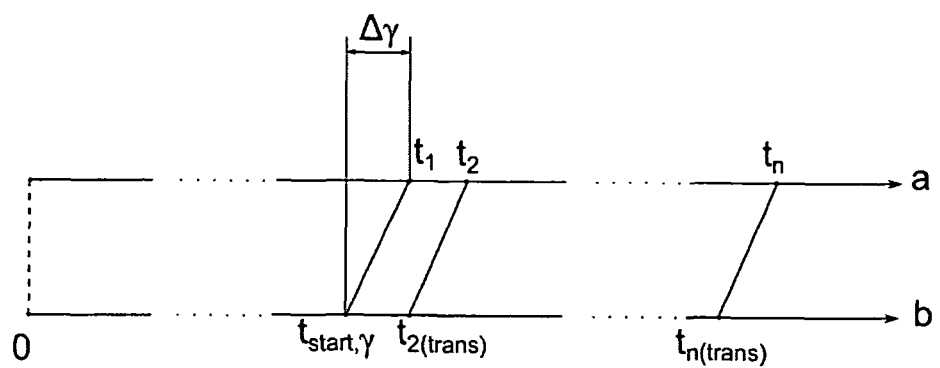
FIG. 3 shows an example of translating an source trajectory of an object to a translated trajectory of said object.

For a plan to form synthetic frames for all objects included in the object displaying schedule to be constructed, said system in block 5 performs the following sequence of operations:

Said system first translates the source trajectory of each object to a trajectory translated to the time axis such that the translated trajectory begins at the display start time of the object given in the schedule. The translation is illustrated in FIG. 3 that shows, in respect of an object under number y, the time axis ("a") for its source trajectory and the time axis ("b") for its translated trajectory. The time axis of its source trajectory ("a") shows moments in time for the γ-th trajectory, beginning with its first moment $t_i$:

$$t_1, t_2, \ldots, t_n,$$

and the time axis of its translated trajectory shows their respective moments in time;

$$t_{start,\gamma}, t_{2(trans)}, \ldots, t_{n(trans)},$$

where:
$t_{start,\gamma}$ is time to start display of the γ-th trajectory, that is, the display time of the first point of the translated γ-th trajectory; and
$t_{2(trans)}$ and $t_{n(trans)}$ are display times of the second and n-th points of the translated γ-th trajectory.

Each point of the source trajectory is translated to a respective point on the translated trajectory along the time axis by a value:

$$\Delta_\gamma = t_1 - t_{start,\gamma}, \quad (4)$$

where:
$\Delta_\gamma$ is translation value for trajectory γ,
the remaining values being as defined above.
Block 5 stores the translation value $\Delta_\gamma$. The source trajectory can be transformed to the translated trajectory by a variety of techniques. For example, transformation can be effected once, and the translated trajectory stored in the memory, or the values of the moments in time of the translated trajectory can be calculated each time when said value is to be used.

Figure 4:
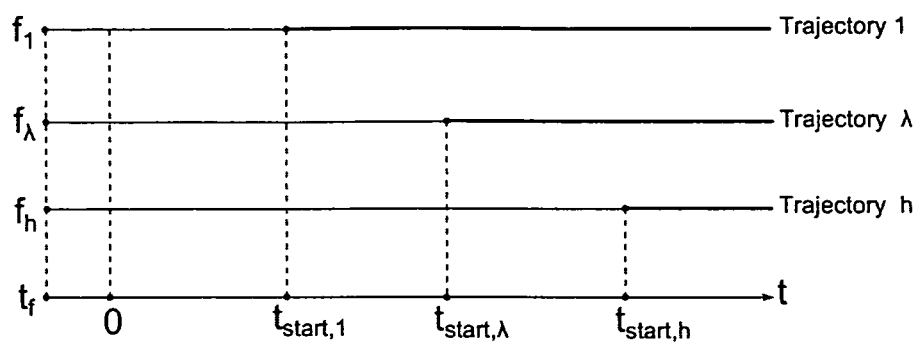
FIG. 4 shows an example of inserting fictitious points in the translated trajectories of the objects.

Further, said system adds a fictitious point corresponding to a fictitious moment in time identical for all objects to the translated trajectory of each object, said fictitious moment in time being smaller than the display start time for any object in the schedule; for example, a negative time value may be chosen as said fictitious point in time. FIG. 4 shows time axes for all trajectories of the objects included in the object displaying schedule, that is, those having numbers λ=1, 2, ..., h in the schedule. The following designations are used in FIG. 4:

$t_{start,1}, \ldots, t_{start,\lambda}, \ldots t_{start,h}$ are moments in time for display start of these trajectories;
$f_1, \ldots, f_1, \ldots f_h$ are fictitious points of said trajectories; and
$t_f$ is fictitious moment in time: $t_f < t_{start,\ 1}$, for example, $t_f < 0$.

Each fictitious point $f_\lambda$ is put in correspondence with a pair, consisting of a fictitious time $t_f$ and an empty set of frame pixels.

The collection of fictitious points of each translated trajectory is set as a initial fictitious element $E_0$ of the plan for forming synthetic frames:

$$E_0 = \langle f_1, \ldots, f_\lambda, \ldots, f_h \rangle, \quad (5).$$

Accordingly, a plan for forming synthetic frames will be described by the formula:

$$P = \langle E_0, E_1, \ldots, E_q, \ldots, E_d \rangle, \quad (6)$$

where all values are as defined above.

Said system then constructs consecutively non-fictitious elements of the plan, each of them having one non-fictitious point or a set of non-fictitious points of the translated trajectories of different objects that will be shown in one synthetic frame, said set containing not more than one point of each translated trajectory. Each non-fictitious point in the set is represented by a pair:

$$(\gamma, t_{\mu(trans)}), \quad (7)$$

where:
μ is number of the point in time in the γ-th trajectory; μ=1, ..., n;

$$t_{\mu(trans)} = t_{start,\gamma(\lambda)} \text{ for } \mu=1;$$

the remaining values being as defined above.
Here:

$$t_{\mu(trans)} = t_\mu - \Delta_\gamma, \quad (8)$$

where:
$\Delta_\gamma$ is translation value for trajectory y defined in formula (4).

Figure 5:
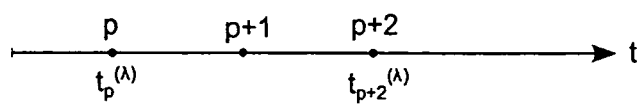
FIG. 5 shows an example of choice of trajectory points for constructing a successive element of a plan for forming synthetic frames.
Figure 5:
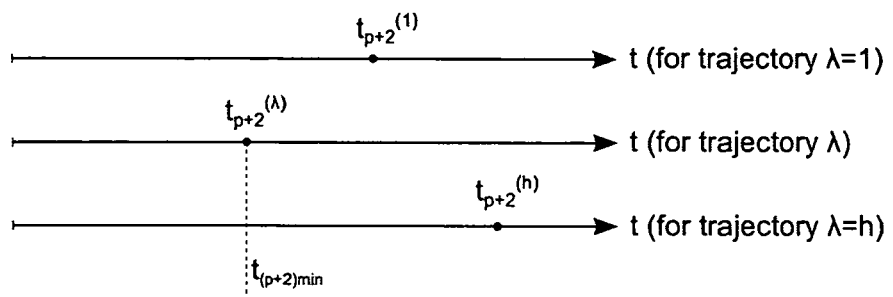
Figure 5:
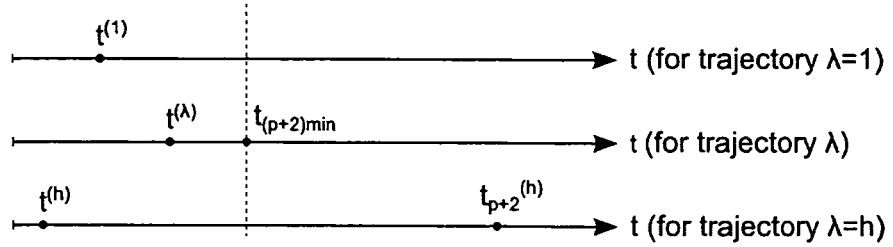

To construct a successive element of the plan, said system performs sequentially the following four steps described below and designated as "a", "b", "c", and "d":

(a) where the need for adding an object to the object displaying schedule arose before completion of constructing the plan for forming synthetic frames, said system inserts a fictitious point of the translated trajectory of the object to be added to the last formed element of the plan, whereupon it goes on to the next step ("b"); said system inserts the fictitious point here for steps "b", "c", and "d" to be performed for the object being added for constructing successive elements of the plan in the same manner as they are for the other objects in the object displaying schedule for which all fictitious points are given as they appear in Formula (5) above in the initial fictitious element $E_0$ of the next plan under construction;

(b) on each translated trajectory λ of the object, said system selects a point $t^{(\lambda)}_{p+2}$ that is located on the time axis t on the right next nearest of the point $t^{(\lambda)}_{p}$ of said trajectory that is included in the preceding element of the plan (FIG. 5, step "b"), or, in other words, on the time axis, a point $t^{(\lambda)}_{p+2}$, is next-but-one to the right of said trajectory's point $t^{(\lambda)}_{p}$ included in the preceding element of the plan; that is, $$t^{(\lambda)}_{p+2} > t^{(\lambda)}_{p}, \qquad (9)$$

where λ is relative number of the trajectory in the object displaying schedule; λ=1, 2, . . . , h;

(c) said system finds, among said points $t^{(\lambda)}_{p+2}$ of all the trajectories, a point having a minimum moment in time $(t_{p+2})_{min}$ (FIG. 5, step "c");

(d) said system selects, for each translated trajectory λ, a point $t^{(\lambda)}$ that is nearest in time to the left of said minimum moment in time $(t_{p+2})_{min}$ (FIG. 5, step "d"), that is, $$t^{(\lambda)} < (t_{p+2})_{min}, \qquad (10)$$

and said system sets the collection of trajectory points corresponding to moments in time $t^{(\lambda)}$ as the next element of the plan.

Checking Permissible Mutual Occlusion of the Objects

To check the condition of permissible mutual occlusion of objects, said system performs the following operations (block 5):

in each element of said plan containing a successive object, said system checks the presence of pixels having identical coordinates in the frame in the image of said object and the images of other objects; and if the number of said pixels for the added object and at least one of the other objects is above the threshold preset by the operator said system captures (or, in otherwise, fixes) the fact of impermissible intersection of the added object with other objects in said element of the plan;

in each element of said plan containing a successive object added to the object displaying schedule, said system checks the presence of spatial intersection of said object with other objects in said element of the plan;

for, each object contained in the schedule, except for the added object, said system counts the number (A) of the elements of said plan in which said object intersects with the added object;

for each object, said system counts the number (B) of elements of said plan in which it occurs;

said system checks the conditions:

$$A_i/B_i < \alpha_i, \qquad (11)$$

$$A_i/B_c < \alpha_c, \qquad (12)$$

where:

i is serial number of an object, except for the object added to the current schedule to be updated;

c is serial number of an object added to the current schedule;

$A_i$ is number of plan elements in which the i-th object intersects with the added object;

$B_i$ is number of plan elements in which the i-th object occurs;

$B_c$ is number of plan elements in which the added object occurs;

$\alpha_i$ and $\alpha_c$ are constants that may be chosen depending on the importance of the object to the operator; in a particular case, $\alpha_i = \alpha_c =$const for all i values;

if Condition (11) and (12) are satisfied simultaneously, said system generates a message that the condition of permissible mutual occlusion of the objects is fulfilled.

Forming a Synthetic Frame

To form a successive synthetic frame corresponding to any element of the plan for forming synthetic frame, said system performs the following operations (block 6):

it finds the frames of the source sequence corresponding to the points of object trajectories that are contained in the plan element corresponding to the synthetic frame being formed; for this purpose, the previously stored value of translation $\Delta_\gamma$ is added to the moment in time corresponding to the point of the translated trajectory of the object that has number γ and is indicated in said plan element, and the obtained moment in time of the source trajectory is used to find the frame of the source sequence of images;

it chooses a frame corresponding to the object having the smallest serial number from said frames as a reference frame on the basis of which a synthetic frame will be constructed;

it forms an intermediate frame containing the objects of the reference frame to be shown and the background against which they must be shown on the basis of the reference frame; and it forms a successive synthetic frame by adding the images of other objects from other frames chosen as above in accordance with said synthetic frame formation plan to the obtained intermediate frame.

Figure 6:
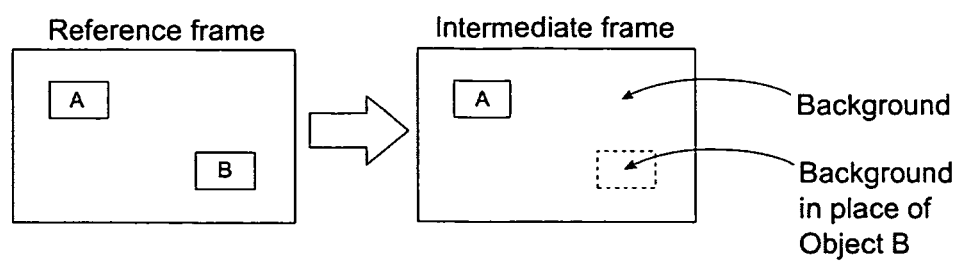
FIG. 6 shows an example of forming intermediate frame.
Figure 7:
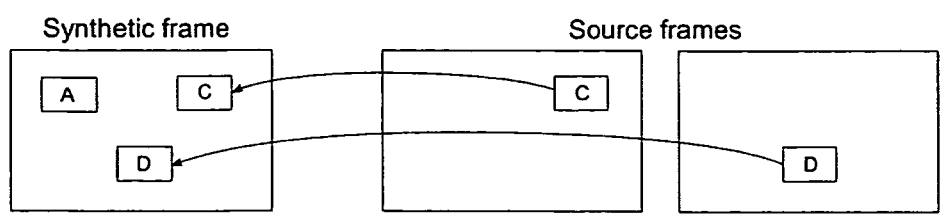
FIG. 7 shows an example of composing synthetic frame.

These operations are clarified by the examples shown in FIG. 6 and FIG. 7. The reference frame contains objects A and B, with object A alone to be shown in the synthetic frame; for this reason, object B is overlapped in the intermediate frame by a respective background fragment (FIG. 6). The synthetic frame (FIG. 7) is formed from the intermediate frame to which the images of objects C and D are translated from other source frames.

Forming the Synthetic Frame Background

The background of the synthetic frame is made up of the reference frame background and background fragments that replace reference frame objects that are not to be shown.

To form the synthetic frame background (box 6), said system replaces the reference frame fragments occupied by any objects, except those that are to be shown in the synthetic frame being formed, with fragments that are not occupied from other frames of the source sequence corresponding to the points of trajectories of objects shown in a plan element corresponding to the synthetic frame being formed.

Figure 8:
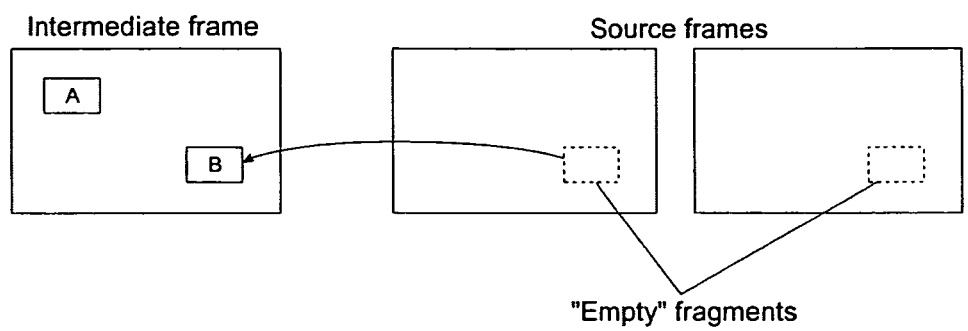
FIG. 8 shows an example of composing of a synthetic frame background fragment.

These steps are clear from the example shown in FIG. 8. The reference frame of the example contains the image of object B that is not to be shown. Said system finds any first frame among the frames of the source sequence corresponding to the points of the translated trajectories of objects contained in the element of the plan corresponding to the synthetic frame being formed, said first frame containing a fragment that is not occupied by objects on the site of object B and replaces object B in the reference frame with this "empty" fragment.

Displaying a Successive Formed Synthetic Frame to the Operator

Said system displays each successive synthetic frame formed to the operator on the screen (block 7) after a delay equal to the minimum nonzero difference between the capture moments in time of any object represented into the preceding and successive synthetic frames. This condition imposes restrictions on the application of the proposed method—each object must be represented in at least two frames of the source sequence of images.
synthetic frames.

What is claimed is:

1. A method for searching for objects in video data received from a fixed video camera comprising:
   detecting objects of interest to the operator in a source sequence of frames received from a fixed video camera, each frame representing an image of a scene and having a timestamp specifying the moment in time said frame was captured;
   constructing a trajectory of movement for each of the detected objects such that each point of the trajectory corresponds to the position of the object in a frame and the capture moment in time of said frame, the position of the object in the frame being represented by a set of frame pixels forming the image of said object;
   forming a queue of movement trajectories of the detected objects;
   compiling a schedule for displaying the detected objects to the operator, said schedule indicating, for the trajectory of each object, a start time upon which said object will be displayed on screen;
   constructing a plan for forming synthetic frames in accordance with said schedule, said synthetic frames may show images of several objects simultaneously in positions that, in the general case, they had in captured frames at different moments in time;
   forming successive synthetic frame in accordance with said plan by inserting the images of objects in said synthetic frame that, according to said plan, are to be shown in said synthetic frame simultaneously and the background against which they are to be shown;
   displaying the formed synthetic frames on screen to the operator;
wherein said forming a queue of movement trajectories comprises:
   (a) ordering all the trajectories in said queue in ascending order of the moments in time when a respective object appeared in the video camera field of view;
   (b) assigning a serial number to each trajectory in the obtained ordered queue of said trajectories and to the object corresponding to said trajectory; and
wherein said schedule for displaying the detected objects is compiled in the order of their serial numbers as follows:
   (a) including initially in said schedule the first object alone, and then
   (b) updating said schedule by removing therefrom objects with trajectories already fully displayed to the operator and adding thereto new objects, if the number of objects included in said schedule is not larger than the value preset by the operator; and
wherein said constructing said plan for forming synthetic frames comprises constructing it when said schedule for displaying the detected objects is first compiled and then each time said schedule is updated; said plan consisting of elements, each one representing a set of trajectory points of different objects to be combined in one synthetic frame.

2. The method of claim 1, wherein updating the schedule for displaying the detected objects comprises:
   adding to said schedule a successive object that has not so far been displayed;
   determining a suitable time to start displaying said added object such that the condition of permissible mutual occlusion of objects be fulfilled in all synthetic frames being formed on the basis of said schedule;
   compiling an updated schedule for displaying the detected objects;
wherein said determining a suitable time and said compiling an updated schedule comprises:
   (a) checking sequentially step by step that said condition of permissible mutual occlusion of objects holds for tentative values of start time of displaying said added object, these tentative time values are being tested in an ascending order at specified discreteness within the range from display start time of an object having a preceding serial number to the display completion time of all objects included in the schedule, except for the added object;
   (b) compiling, at each checking step, a tentative schedule for displaying the detected objects, including said added object, wherein compiling the tentative schedule comprises setting in said tentative schedule the successive tentative time value as the start time to display said added object;
   (c) constructing a plan for forming synthetic frames according to said tentative schedule for all objects included in said schedule;
   (d) checking thereafter if the condition of permissible mutual occlusion of objects holds in all synthetic frames and, depending on the outcome, proceeding to the steps of:
   (e) proceeding-to checking the next tentative time value, if said condition does not hold; or otherwise,
   (f) accepting the current tentative time value as the time to start displaying the added object and accepting the compiled tentative schedule as said updated schedule for displaying the detected objects, if said condition is held.

3. The method of claim 2, wherein constructing the plan for forming synthetic frames for all objects included on the schedule for displaying the detected objects comprises:
   translating the source trajectory of each object along the time axis such that the translated trajectory would begins at the display start time indicated in the schedule and storing the translation value, being equal to the difference between the moment in time corresponding to said object's source trajectory first point and the display start time of said object;
   adding a fictitious point to the translated trajectory of each object, wherein said fictitious point corresponds to a fictitious moment in time identical for all objects that is smaller than the display start time for any object in said schedule;
   setting the collection of fictitious points of all translated trajectories, corresponding to said fictitious moment in time, as the initial fictitious element of said plan being constructed;
   constructing consecutively elements of said plan, wherein each of said elements has a set of points of translated trajectories of different objects to be shown in one synthetic frame, said set containing not more than one point of each translated trajectory, wherein constructing each next element of said plan comprises the sequence of the following operations:
   (a) adding a fictitious point of the trajectory of the added object to the last formed element of said plan, if the need for updating the schedule for displaying the detected objects arose before the completion of constructing said plan;

(b) selecting, in each translated trajectory, a point that, on the time axis, is next-but-one to the right of said trajectory's point included in the preceding element of the plan;

(c) finding a point having the minimum moment in time among said selected points of all trajectories; and (d) selecting a point for each translated trajectory that is nearest in time to the left of said minimum moment in time and setting the set of said selected points as the next element of the plan.

4. The method of claim 2, wherein checking the condition of permissible mutual occlusion of objects comprises:

(a) checking each element of said plan for forming synthetic frames, provided said element contains the successive added object, for the presence of pixels in the image of said object having identical within-frame coordinates with pixels of other objects contained in said element of the plan;

(b) putting on record the fact of impermissible intersection of the added object with other objects in said element of the plan, if the number of said pixels common for the added object and at least one of other objects exceeds the threshold preset by the operator;

(c) counting the number (A) of the elements of said plan for each object contained in said tentative schedule, except for the added object, for which said object intersects impermissibly with the added object;

(d) counting the number (B) of the elements of said plan for each object in which said object occurs;

(e) checking the conditions:

$$A_i/B_i < \alpha_i, \quad (11)$$

$$A_i/B_c < \alpha_c, \quad (12)$$

where:
- i is the object serial number, except for the object added to the current schedule to be updated;
- c is the serial number of the object added to said current schedule;
- $A_i$ is the number of elements of said plan for which the i-th object intersects impermissibly with the added object;
- $B_i$ is the number of elements of said plan in which the i-th object occurs;
- $B_c$ is the number of elements of said plan in which the added object occurs; and
- $\alpha_i$ and $\alpha_c$ are constants that may be chosen depending on the importance of the object to the operator; in a particular case, $\alpha_i = \alpha_c = $ const for all i; and (f) generating a message that the condition of permissible mutual occlusion of objects is fulfilled, if conditions (11) and (12) are satisfied simultaneously.

5. The method of claim 3, wherein forming the successive synthetic frame corresponding to any element of the plan for forming synthetic frames comprises:

(a) finding, in the source sequence, frames that correspond to points of the translated trajectories of objects, these points are contained in the element of said plan, said element corresponding to the synthetic frame being formed, finding said frames is performed by the capture times of said frames, said time being calculated as a sum of the translation value corresponding to the translated trajectory of said object and the moment in time corresponding of said point of said trajectory;

(b) choosing from said frames a frame that corresponds to the object with the least serial number and accepting said frame as a reference frame on the basis of which a synthetic frame is to be constructed;

(c) forming an intermediate frame on the basis of the reference frame, wherein the intermediate frame contains objects of the reference frame to be displayed and the background against which they are to be displayed; and (d) composing said successive synthetic frame by inserting, in the obtained intermediate frame, the images of other objects the trajectory points of which were included in the plan element corresponding to the synthetic frame being formed.

6. The method of claim 5, wherein composing the synthetic frame background comprises replacing reference frame fragments occupied by any objects except those that are to be shown in the synthetic frame being formed with object-free fragments from other frames of the source sequence, said other frames corresponding to the trajectory points of objects shown in said plan element corresponding to the synthetic frame being formed.

7. The method of claim 1, further comprising displaying to the operator on the screen each successive formed synthetic frame with a delay equal to the minimum nonzero difference between the capture moments in time of any object represented into the preceding and successive synthetic frames.

\* \* \* \* \*